United States Patent
Caracci et al.

(10) Patent No.: US 7,062,135 B2
(45) Date of Patent: Jun. 13, 2006

(54) METHOD FOR FABRICATING CURVED ELEMENTS

(75) Inventors: Stephen J. Caracci, Corning, NY (US); Alain R. E. Carre, Le Chatelet-En-Brie (FR); Adam J. Fusco, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 149 days.

(21) Appl. No.: 10/392,077

(22) Filed: Mar. 19, 2003

(65) Prior Publication Data

US 2003/0179994 A1    Sep. 25, 2003

Related U.S. Application Data

(60) Provisional application No. 60/405,284, filed on Aug. 21, 2002.

(30) Foreign Application Priority Data

Mar. 21, 2002  (EP)  ................................. 02290720

(51) Int. Cl.
   *G02B 6/02* (2006.01)
   *G02B 6/16* (2006.01)
   *G02B 6/42* (2006.01)
   *C03B 37/00* (2006.01)
   *B29D 11/00* (2006.01)

(52) U.S. Cl. .................. 385/123; 65/385; 65/387; 65/404; 264/1.24; 264/1.26; 385/147

(58) Field of Classification Search .................. 385/31, 385/33–35, 39, 76, 141, 123–128, 134, 139–145; 264/1.24–1.29; 438/29, 31–32; 65/376, 65/385, 387, 393

See application file for complete search history.

(56) References Cited

U.S. PATENT DOCUMENTS 3,288,585 A  *  11/1966  Clarke .......................... 65/37
3,932,184 A      1/1976  Cohen et al. ................. 96/38.3

(Continued)

FOREIGN PATENT DOCUMENTS

EP          0175486       3/1986

(Continued)

OTHER PUBLICATIONS

Hartmann et al., "Microlenses Self-Aligned to Optical Fibers Fabricated Using the Hydrophobic Effect", IEEE Photonic Technology Letters, vol. 13, No. 10, Oct. 2001, pp. 1088-1090.

(Continued)

*Primary Examiner*—Frank G. Font
*Assistant Examiner*—Ryan Lepisto
(74) *Attorney, Agent, or Firm*—Timothy Schaeberle

(57) ABSTRACT

The present invention provides methods for forming convex and concave elements on the ends of supporting members. A convex element may be formed by forming a droplet on the end of the supporting member, then curing the droplet. The size of the droplet may be controlled using evaporation of a solvent from the droplet. In another aspect of the invention, an optical element may be formed by forming a droplet on the end of the supporting member, contacting the droplet with a mold, and curing the droplet, thereby forming an element with a curvature opposite that of the mold. When the supporting member is an optical fiber, the elements formed by the methods of the present invention are useful as lenses and mirrors in micro-optic devices.

5 Claims, 11 Drawing Sheets

U.S. PATENT DOCUMENTS

| | | | |
|---|---|---|---|
| 4,067,937 A * | 1/1978 | Unno et al. | 264/1.26 |
| 4,118,270 A * | 10/1978 | Pan et al. | 216/24 |
| 4,159,863 A | 7/1979 | Stewart | 380/96.18 |
| 4,265,699 A * | 5/1981 | Ladany | 216/97 |
| 4,289,572 A * | 9/1981 | Sawyer et al. | 117/35 |
| 4,380,365 A * | 4/1983 | Gross | 385/33 |
| 4,390,589 A * | 6/1983 | Geyling et al. | 428/381 |
| 4,478,770 A * | 10/1984 | Vofsi et al. | 264/2.1 |
| 4,653,847 A * | 3/1987 | Berg et al. | 385/79 |
| 4,671,609 A * | 6/1987 | Khoe et al. | 385/33 |
| 4,834,493 A * | 5/1989 | Cahill et al. | 385/77 |
| 5,015,504 A * | 5/1991 | Gent et al. | 427/284 |
| 5,169,677 A * | 12/1992 | Sangyoji et al. | 427/581 |
| 5,310,623 A | 5/1994 | Gal | 430/32 |
| 5,402,510 A | 3/1995 | Kalonji et al. | 385/33 |
| 5,439,621 A * | 8/1995 | Hoopman | 264/2.5 |
| 5,627,922 A | 5/1997 | Kopelman et al. | 385/12 |
| 5,629,997 A * | 5/1997 | Hardy, Jr. | 385/33 |
| 5,638,471 A | 6/1997 | Semo et al. | 385/33 |
| 5,701,373 A | 12/1997 | Oleskevich | 385/33 |
| 5,768,022 A | 6/1998 | Lawandy | 359/620 |
| 5,801,884 A | 9/1998 | Sato et al. | 359/620 |
| 6,051,190 A * | 4/2000 | Birch et al. | 422/100 |
| 6,445,838 B1 | 9/2002 | Caracci et al. | 385/14 |
| 6,445,939 B1 | 9/2002 | Swanson et al. | 600/342 |
| 6,597,510 B1 * | 7/2003 | Bunkenburg et al. | 359/620 |
| 2001/0038737 A1 * | 11/2001 | Imada et al. | 385/33 |
| 2002/0100859 A1 * | 8/2002 | Yagi et al. | 249/111 |
| 2003/0086178 A1 * | 5/2003 | Bunkenburg et al. | 359/626 |
| 2003/0123155 A1 * | 7/2003 | Quake et al. | 359/664 |
| 2004/0108210 A1 * | 6/2004 | Yagi et al. | 205/70 |

FOREIGN PATENT DOCUMENTS

| | | | |
|---|---|---|---|
| EP | 0260742 | | 3/1988 |
| EP | 0426441 A2 | | 5/1991 |
| EP | 0497489 B1 | | 4/1995 |
| EP | 1306702 A1 | | 5/2003 |
| GB | 1480616 | * | 7/1976 |
| GB | 1480616 | | 7/1977 |
| WO | WO 01/71403 A1 | | 9/2001 |

OTHER PUBLICATIONS

Hartmann et al., "Optimization and Theoretical Modeling of Polymer Microlens Arrays Fabricated with the Hydrophobic Effect", Applied Optics, vol. 40, No. 16, Jun. 1, 2001, pp. 2736-2746.

Hartmann et al., "Characterization of a Polymer Microlens Fabricated by the use of the Hydrophobic Effect", Optics Letters, vol. 25, No. 13, Jul. 1, 2000, pp. 975-977.

Bachelot et al., "Integration of Micrometer-Sized Polymer Elements at the End of Optical Fibers by Free-Radical Photopolymerization", Applied Optics, vol. 40, No. 32, Nov. 10, 2001, pp. 5860-5871.

* cited by examiner

METHOD FOR FABRICATING CURVED ELEMENTS

CROSS-REFERENCE TO RELATED APPLICATIONS

The present application claims the benefit of priority under 35 U.S.C. §119 to European Patent Application No. 02290720.8, filed Mar. 21, 2002; and to U.S. Provisional Patent Application No. 60/405,284, filed Aug. 21, 2002. Both of the aforementioned applications are hereby incorporated herein by reference in their entirety.

BACKGROUND OF THE INVENTION

1. Field of the Invention

The present invention relates generally to methods of forming elements with specific shapes, and more specifically to methods of forming elements having a curved free surface on an end of a supporting member.

2. Technical Background

In optical communication systems, messages are transmitted by electromagnetic carrier waves at optical frequencies that are generated by such sources as lasers and light-emitting diodes. There is interest in such optical communication systems because they offer several advantages over conventional communication systems. Optical communications systems are described in detail in Hecht, J. Understanding Fiber Optics, $3^{rd}$ Ed., Prentice Hall, Upper Saddle River, N.J., 1999, as well as in European Patent Application Publications EP 0 398 991 and EP 0 474 692.

Optical fibers are conventionally used to transmit signals in optical communications systems. Optical fibers in which a single optical mode is allowed for the wavelength of the optical signal are generally the most desirable for use in optical communications systems. Single mode fibers tend to have very small core diameters, on the order of 5–10 µm. Coupling optical radiation from a source such as a laser or a light emitting diode into the core of a single mode fiber is difficult. The optical signal emerging from the end of an optical fiber tends to diverge, making it problematic to use the emerging optical signal in a free-space device. To solve these problems, a lensing system is often used at the end of the optical fibers.

Lensing systems often include an optical fiber with curved elements built directly on the end of the fiber. Due to the small size of the end of the optical fiber, conventional manufacturing techniques are not appropriate for the formation of the curved element. Existing methods for providing curved elements on the ends of optical fibers use techniques such as gray-scale photolithography and glass melting to provide curvature. Glass melting methods are described in International Patent Application Publication Number WO 01/71403. In these methods, a molten drop of glass is formed on the end of an optical fiber, and is allowed to harden by cooling, forming a ball lens on the end of the fiber. However, these methods can be difficult to perform, and may not yield elements with the curvature desired for a specific application.

SUMMARY OF THE INVENTION

One aspect of the present invention relates to a method for forming an element having a curved free surface on an end of a supporting member, the method including the steps of forming a droplet of a liquid composition on the end of the supporting member, the droplet having a curved surface remote from the supporting member; and causing the droplet of the liquid composition to solidify to form the element, wherein the liquid composition is a curable element composition, and the droplet is caused to solidify by curing it.

Another aspect of the present invention relates to a method for forming an element having a curved free surface on an end of a supporting member, the method including the steps of forming a droplet of a curable element composition on the end of the supporting member, the droplet having a curved surface remote from the supporting member, the shape of the droplet being freely established under the effect of is own surface tension; and curing the droplet of the curable element composition to form the element.

Another aspect of the present invention relates to a method for forming an element having a curved free surface on an end of a supporting member, the method including the steps of forming a droplet of a curable element composition on the end of the supporting member, the curable element composition including a volatile solvent, the droplet having a curved surface remote from the supporting member, the shape of the droplet being freely established under the effect of is own surface tension; allowing the volatile solvent to evaporate, thereby decreasing the volume of the droplet; and curing the droplet of the curable element composition to form the element.

Another aspect of the present invention relates to a method for forming an element having a curved free surface on an end of a supporting member, the method including the steps of providing a mold element having a curved surface; forming a droplet of a curable element composition on the end of the supporting member, the droplet having a curved surface remote from the supporting member, the curved surface of the droplet being defined by contact with the curved surface of the mold element; and causing the droplet of the curable element composition to form the element.

Another aspect of the present invention is an optical structure including an optical fiber having an end; and a concave element on the end of the optical fiber, wherein the optical fiber is an inorganic optical fiber and the concave element is made from a cured polymeric material.

Another aspect of the present invention is an optical structure including an optical fiber having an end; and a curved element on the end of the optical fiber, wherein the optical fiber is an inorganic optical fiber, and the curved element is made from a cured polymeric material, and has a radius of curvature of greater than about 50 µm.

The methods of the present invention result in a number of advantages over prior art methods. For example, the methods described herein provide for the formation of curved elements of a wide range of curvatures and sizes. The methods described herein may be used to form curved elements on the ends of supporting members with very small cross-sectional areas. The methods of this invention can be performed at room temperature. Further, the methods of the present invention may be performed using relatively equipment of relatively low cost. Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

DETAILED DESCRIPTION OF THE PREFERRED EMBODIMENTS

Figure 1:
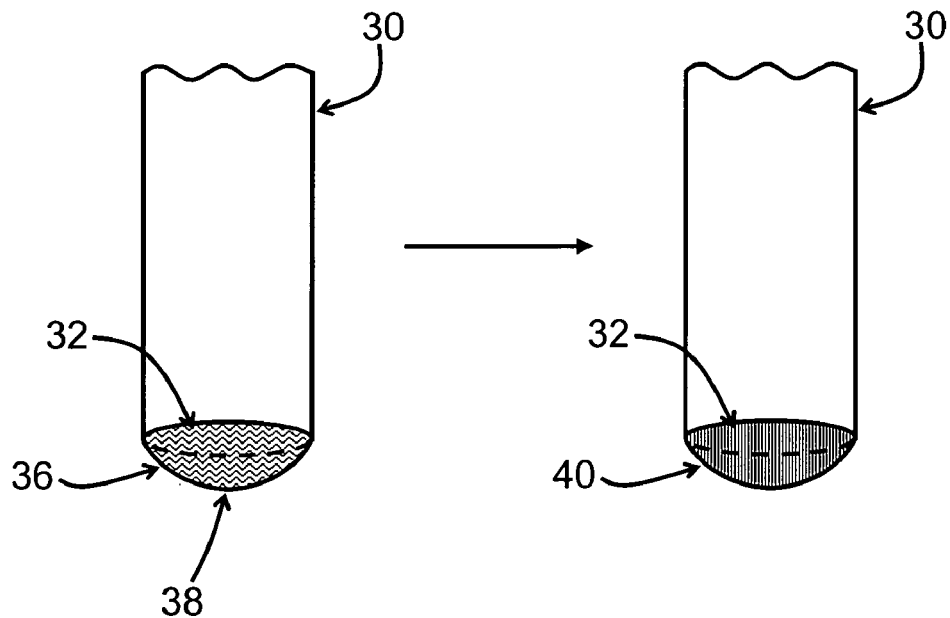
FIG. 1 illustrates a method of creating a curved element on the end of a supporting member according to one embodiment of the present invention.

One aspect of the present invention provides a method for forming a curved element on the end of a supporting member. The method includes the steps of forming a droplet of a curable element composition on the end of the supporting member; and curing the droplet of the curable element composition to form the element. For example, as shown in FIG. 1, a supporting member 30 having an end 32 is provided. The end may be prepared by methods familiar to the skilled artisan; for example, the end may be prepared by cleaving or polishing. A droplet 36 of a curable element composition is formed on the end of the supporting member. The shape of the droplet is freely established under the effect of its own surface tension. If the supporting member is cylindrical, as shown in FIG. 1, the droplet may be semi-spherical. A semi-spherical droplet need not be precisely spherical; it can be aspherical toward its edges, and substantially spherical in its central region. A semi-spherical droplet can be characterized by its radius of curvature at its apex (38). The droplet is cured to form the curved element 40.

The curable element composition is an energy curable liquid material that, when cured, becomes the material of the curved element. Preferably, the curable element composition is a liquid at room temperature. The curable element composition may be curable, for example, by actinic radiation or by thermal energy. The curable element composition may be based, for example, on acrylate, methacrylate, epoxy, thiol-ene, vinyl ether or silicone chemistries. For example, the curable element composition may be UV9300, a solventless UV curable epoxysilicone, available from General Electric, Inc. of Schenectady, N.Y.; SYLGARD 184, a room temperature vulcanizable two part silicone elastomer available from the Dow Corning Corporation, of Midland, Mich.; NORLAND Optical Adhesive 78, a UV-curable thiomethacrylate adhesive available from Norland Products, Inc., of Cranberry, N.J.; or a specially formulated composition. As the skilled artisan will appreciate, virtually any desirable curable liquid composition may be used in the methods of the present invention. For use in optical applications, it is desirable that the curable element composition be curable to yield a polymeric material that is substantially transparent at a desired wavelength.

Figure 2:
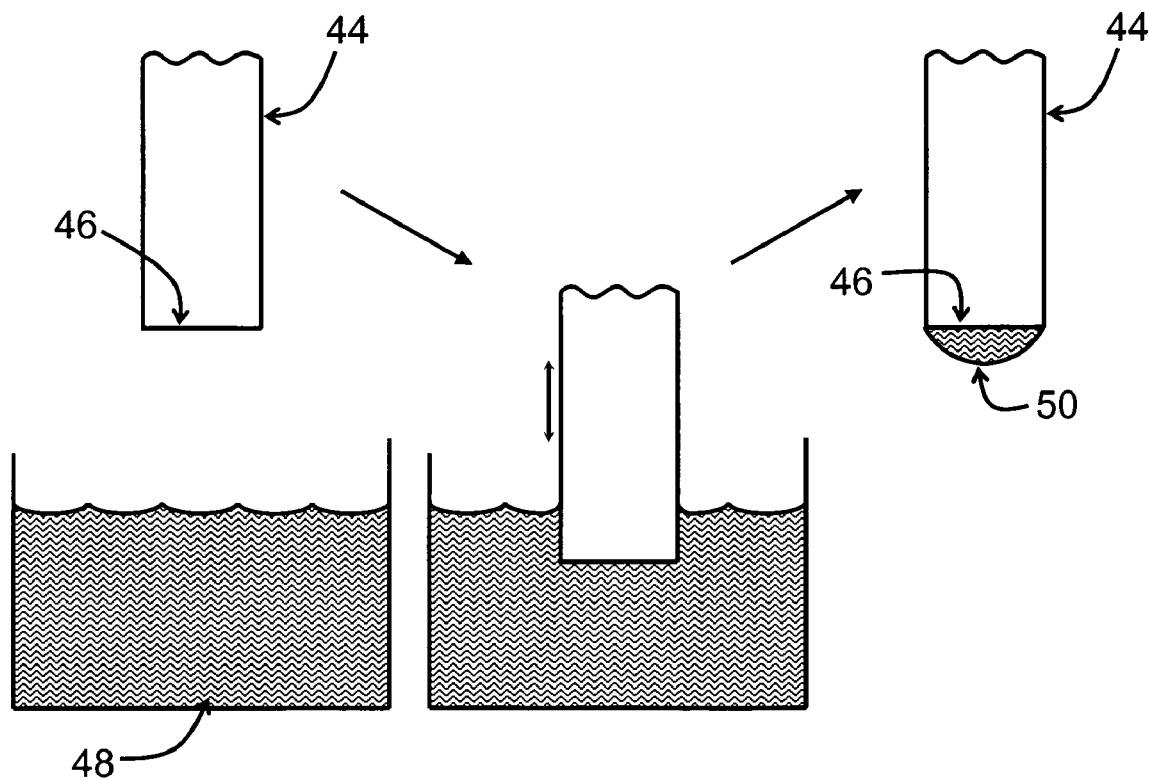
FIG. 2 illustrates a method of forming a droplet on the end of a supporting member.

In one embodiment of the present invention, shown in FIG. 2, the end 46 of a cylindrical supporting member 44 is dipped into a bulk sample of curable element composition 48. As used herein, dipping includes the step of immersing the end into a liquid followed by slowly removing the end from the liquid. As a result of the dipping step, the semi-spherical droplet 50 is formed. The volume of the droplet is reproducible, and depends little on the depth of immersion of the supporting member into the liquid, provided that the supporting member is withdrawn from the liquid slowly enough to allow the liquid to flow and to wet the end of the supporting member. As long as the depth of the bulk sample is several times greater than the dimensions of the supporting member, the volume of the droplet of curable element composition collected at the end of the supporting member is substantially independent of the depth of the bulk sample. Formation of droplets on the ends of supporting members is described in U.S. Pat. No. 6,051,190.

Figure 3:
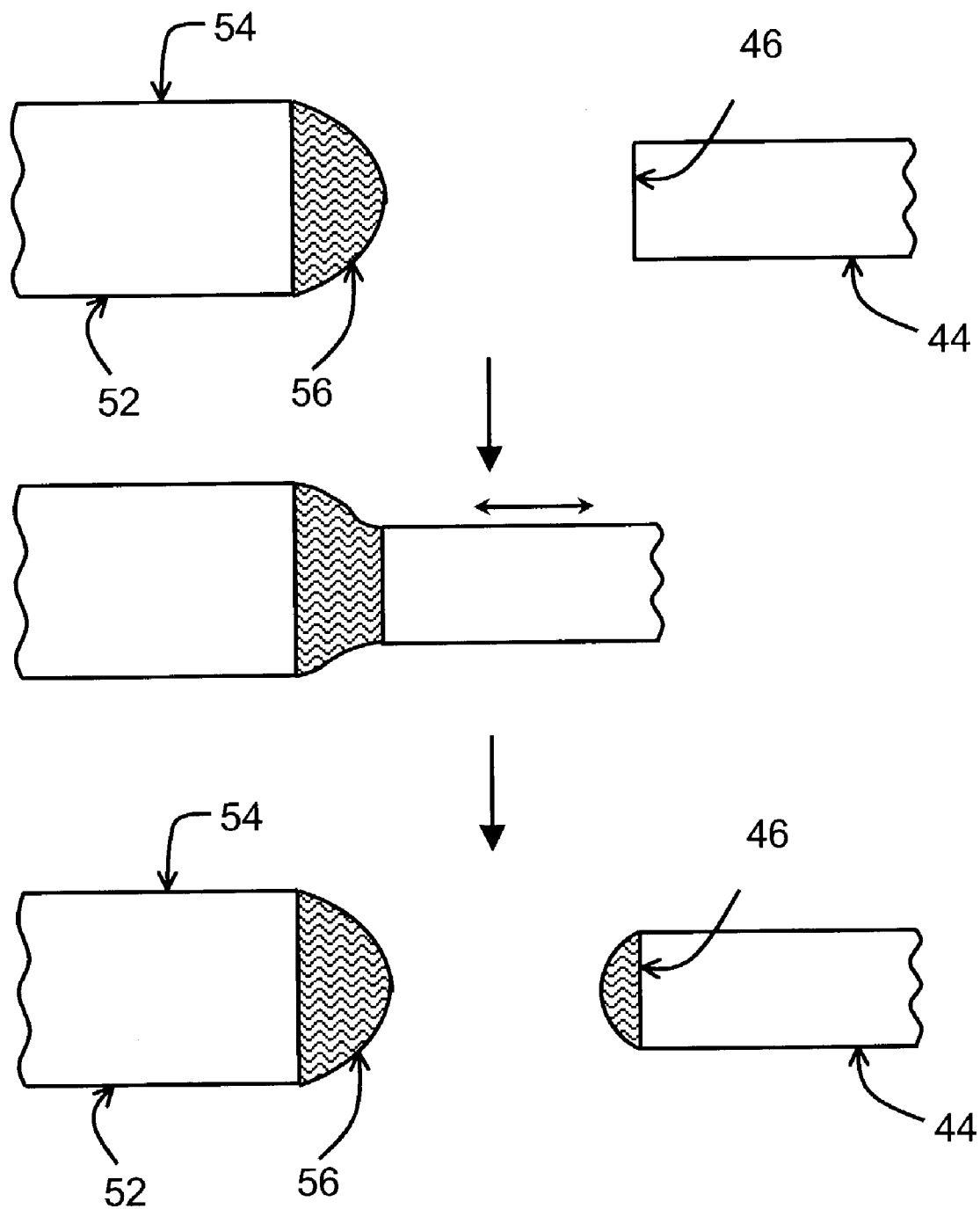
FIG. 3 illustrates another method of forming a droplet on the end of a supporting member.

In another embodiment of the present invention, shown in FIG. 3, a reservoir member 52 having an end 54 is provided. A drop 56 of the curable element composition is formed on the end 54 of the reservoir member 52. The reservoir member need not be cylindrical; it may have an elliptical, rectangular, triangular, or more complex cross-sectional shape. The drop may be formed on the end of the reservoir member by dipping, as described above. The end 46 of the supporting member 44 is brought into and out of contact with the drop 56. As used herein, bringing a supporting member into and out of contact with a drop means contacting the supporting member with the drop, followed by slowly removing the supporting member away from the reservoir member bearing the drop. In this process, some of the curable element composition is transferred to the end of the supporting member. The droplet 50 is thus formed on the end 46 of the supporting member. The volume of the droplet formed by transfer from a reservoir member will depend upon the areas of the ends of the supporting member and of the reservoir member, and upon the volume of the drop. For example, if both the reservoir member and the supporting member are cylindrical and have about the same radius, about half of the drop on the end of the reservoir member will be transferred to the end of the supporting member. As the skilled artisan will appreciate, the volume of the droplet formed on the end of the supporting member will be a function of the size of the reservoir member and of the volume of the drop on the end of the reservoir member. The volume of a droplet deposited from a small drop on a reservoir member will depend strongly on the volume of the reservoir member drop, while the volume of a droplet deposited from relatively large reservoir member drop will be fairly insensitive to the volume of the reservoir member drop.

Regardless of its method of formation, the volume of the droplet of curable element composition initially formed on the end of the supporting member is primarily a function of the area of the end of the supporting member and of the volume of the pool (e.g. bulk sample or drop) of curable element composition from which the droplet is formed. The volume of the droplet may also vary slightly with other parameters, such as the surface tension of the liquid and the viscosity of the liquid. As mentioned above, the droplet formed on the end of a cylindrical supporting element is semi-spherical, and can be characterized by its radius of curvature at its apex. For a cylindrical supporting element having a given radius, the radius of curvature of the droplet will depend upon the volume of the droplet; droplets with larger volumes will have smaller radii of curvature. The relationship between droplet volume and radius of curvature is given by $$v \approx \frac{\pi}{3}\left(R_c - \sqrt{R_c^2 - r^2}\right)\left(R_c^2 + r^2 - R_c\sqrt{R_c^2 - r^2}\right)$$

wherein v is the droplet volume, r is the radius of the cylindrical support member, and $R_c$ is the radius of curvature of the semi-spherical droplet. A similar trend holds true for non-cylindrical supporting elements; the larger the droplet volume, the more curvature the droplet will have. The curable element composition is generally confined to the droplet on the end of the supporting member. Preferably, there is substantially no curable element composition deposited on the sides of the supporting member.

When using a supporting member with a very wettable surface, wetting of the sides of the supporting member may cause irreproducible results. In these cases, it is desirable to make the sides of the supporting member non-wettable, while maintaining the wettability of the end of the supporting member. This may be achieved by treating the supporting member with a non-wetting surface treatment, followed by polishing, cutting or cleaving the supporting member to expose an end. As the exposed end was not treated with the non-wetting surface treatment, it remains wettable. One example of a suitable non-wetting surface treatment is heptadecafluorodecyl-1H,1H,2H,2H-trichlorosilane. When a cylindrical supporting member with non-wetting sides and a wetting end is dipped into a liquid, the volume of the droplet formed on the end of the supporting member is given by $$v \approx Ar^3$$

where v is the volume of the droplet, r is the radius of the supporting member, and A is a proportionality constant. The proportionality constant may depend on factors such as the surface tension of the liquid and the surface energy of the end of the supporting member, and can be determined experimentally for a given system. A typical value for the proportionality constant A is about 1.24.

Figure 4:
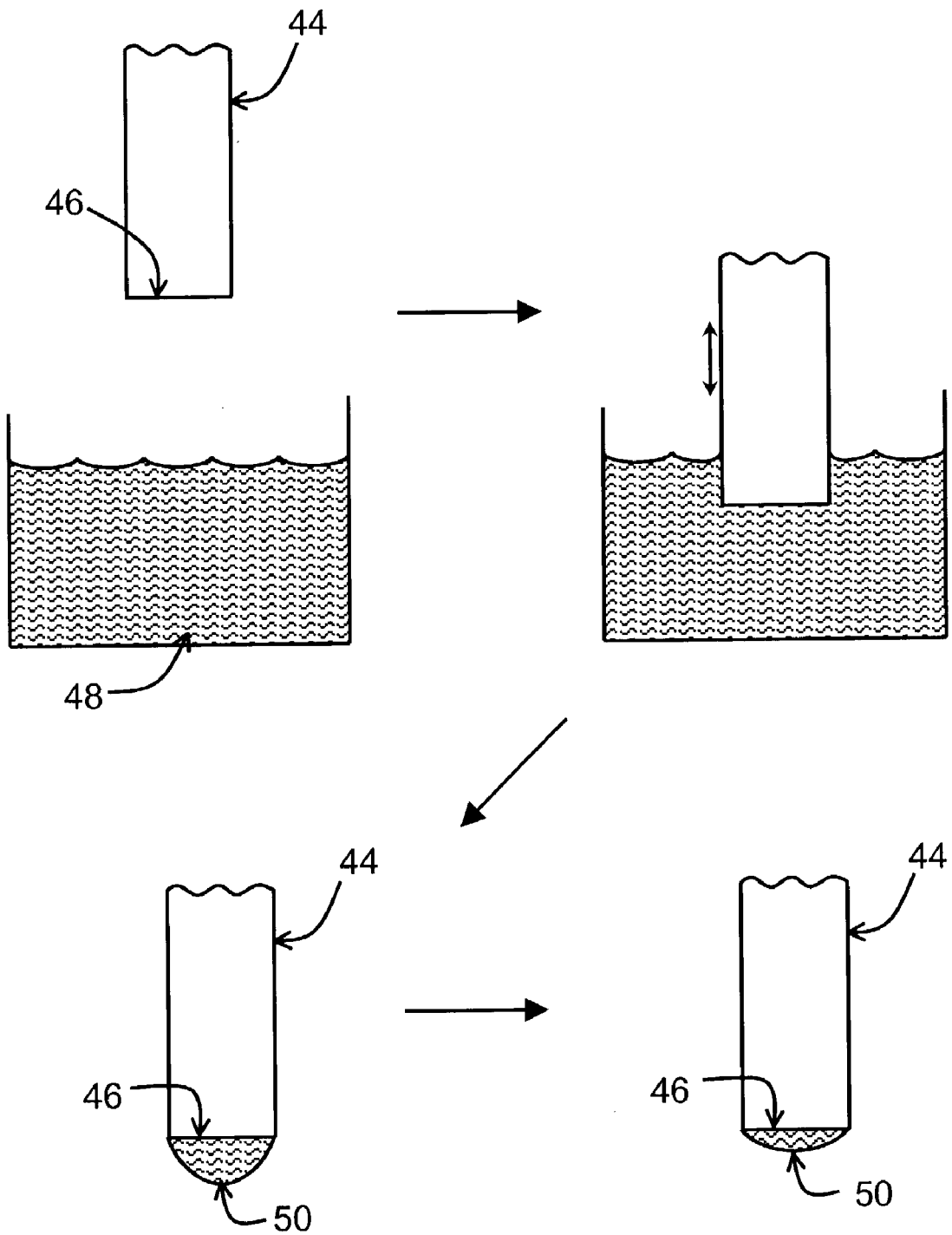
FIG. 4 illustrates another method of forming a droplet on the end of a supporting member.

As the skilled artisan will appreciate, it is desirable to control the curvature of the droplet of curable element composition in order to control the curvature of the curved element made therefrom. In another embodiment of the present invention, shown in FIG. 4, the volume of the droplet may be controlled by using a curable element composition including a volatile solvent. The droplet 50 is formed on the end 46 of the supporting member 44 by dipping into a bulk sample 48 of the curable element composition as described above. Depending primarily on the area of the end of the supporting member, the droplet will have an initial volume. The volatile solvent is then allowed to evaporate, decreasing the volume of the droplet and thereby increasing the curvature of the droplet. As the skilled artisan will appreciate, it is desirable to use a solvent that is miscible with the curable element composition. For example, conventional silicone-based curable element compositions may be diluted with hydrocarbon solvents, such as pentane, hexane, octane, or dodecane. Other classes of solvents may be used in conjunction with different curable element compositions.

In order to provide a reproducible process, it may further be desirable to use a solvent that is volatile enough to evaporate rapidly from the droplet, but not volatile enough to evaporate rapidly from the surface of the bulk sample. The relative rate of evaporation of the solvent depends on the surface-to-volume ratio of the evaporating sample. Use of a solvent of only moderate volatility prevents the bulk sample of curable composition from changing appreciably on the bench, while allowing the droplet to reach its final volume in a reasonable amount of time. Desirable alkane solvents include octane, decane and dodecane. As the skilled artisan will appreciate, other solvents having similar volatility may advantageously be used with different curable element compositions.

Figure 5:
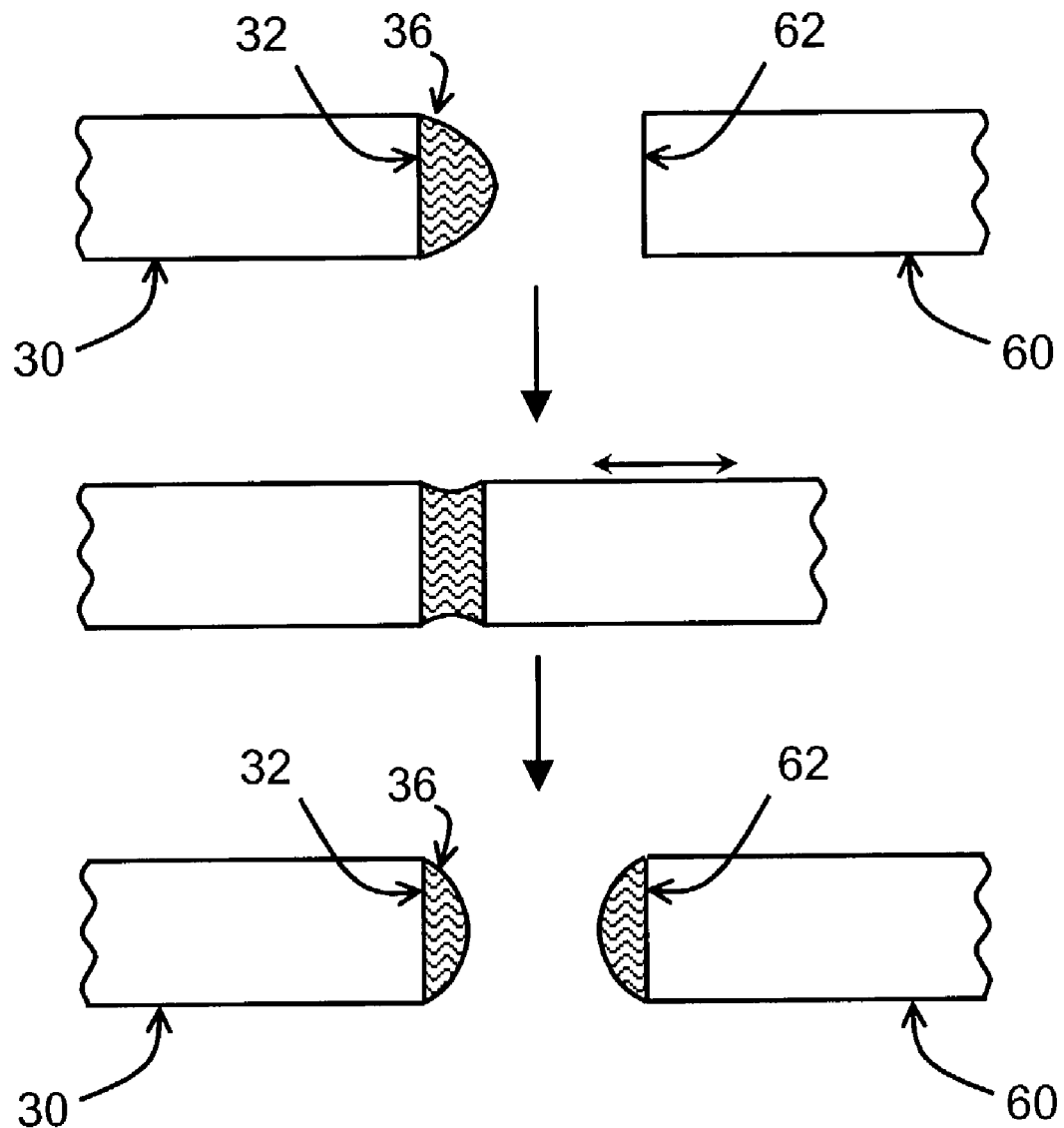
FIG. 5 illustrates a method of reducing the volume of a droplet on the end of a supporting member.

In another embodiment of the present invention, the volume of the droplet may be controlled by one or more transfers between the end of the supporting member and one or more reservoir members or transfer members. As described above, the volume of the droplet formed by transfer from a drop on the end of a reservoir member is determined in part by the area of the end of the reservoir member as well as by the volume of the drop on the end of the reservoir member. The size of the droplet formed in a single transfer may be controlled by the skilled artisan through selection of the area of the end of the reservoir member. The volume of the droplet may also be controlled by transferring material to and from other members. For example, as shown in FIG. 5, a supporting member 30 having on its end 32 a droplet 36 of volume $v_0$ may be formed by dipping or by transfer from a reservoir member as described above. The droplet 36 is brought into and out of contact with the end 62 of a transfer member 60. As used herein, bringing a droplet into and out of contact with a transfer member means contacting the droplet with the transfer member, followed by slowly moving the supporting member bearing the droplet away from the transfer member. In this process, some of the curable element composition is transferred from the droplet to the end of the transfer member. The amount of material transferred will depend on the volume of the droplet as well as the area of the end of the transfer element. For example, if both the supporting element and the transfer element are cylindrical and have the same radius, the volume of the droplet after transfer will be about $\frac{1}{2}v_0$. This process can be repeated to further reduce the volume of the droplet.

Figure 6:
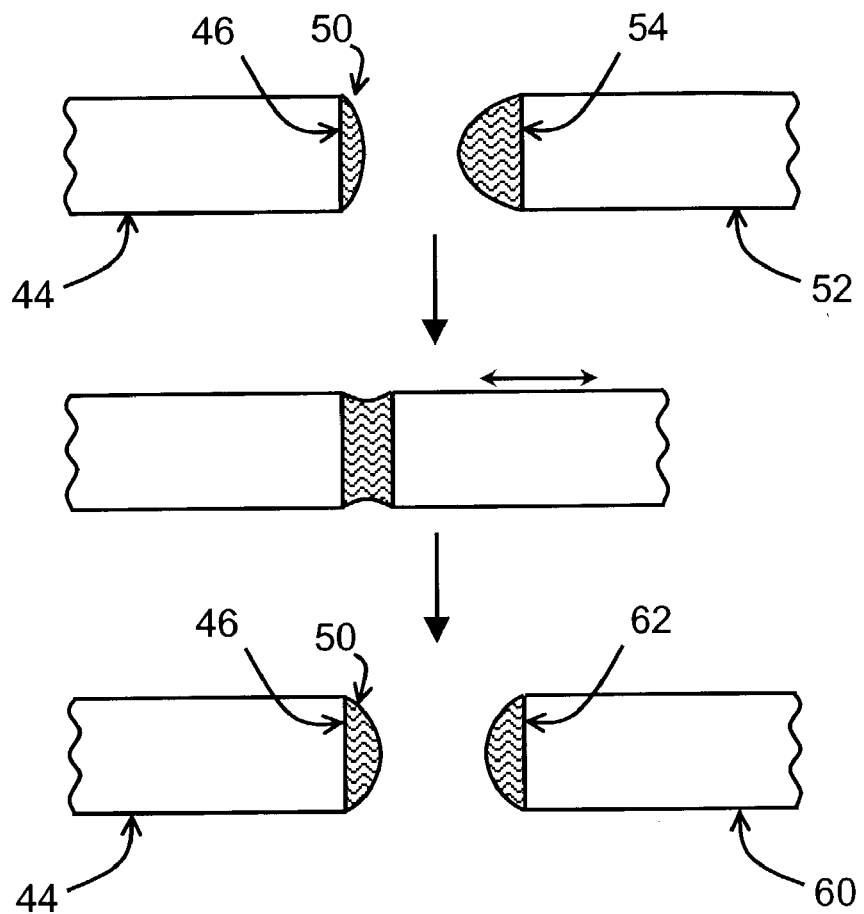
FIG. 6 is illustrates a method of adjusting the volume of a droplet on the end of a supporting member.

The droplet on the end of the supporting member can likewise be brought into and out of contact with a drop on the end of a reservoir element, as shown in FIG. 6. As used herein, bringing a droplet into and out of contact with a drop means contacting the droplet with the drop, followed by slowly moving the supporting member bearing the droplet away from the reservoir member bearing the drop. In this process, some of the curable element composition may transferred between the droplet and the drop on the end of the reservoir member. The amount of material transferred and the direction of transfer will depend on the volume of the droplet and of the drop as well as on the areas of the ends of the supporting and reservoir members. For example, if a droplet 50 having a volume $\frac{1}{2}v_0$ on the end 46 of a cylindrical supporting member 44 is contacted with a drop 56 having a volume $v_0$ on the end 54 of a cylindrical reservoir 52 member having the same radius as the cylindrical supporting member, the droplet volume after transfer will be about $\frac{3}{4}v_0$. As the skilled artisan will appreciate, a combination of transfers may be used to yield the desired droplet volume, and hence the desired curvature of the droplet.

The supporting, reservoir and transfer members used in the present invention may be constructed in a variety of manners from a variety of materials. The supporting, reservoir and transfer members may be formed from materials such as glass, metal, or plastic. Techniques such as photolithography, molding, machining, fiber drawing, cleaving and polishing may be used to construct the supporting, reservoir and transfer members. The supporting, reservoir and transfer members may be, for example, optical fibers, metallic pins, glass rods or plastic pedestals. In preferred embodiments of the invention, the supporting member is an inorganic optical fiber. As used herein, an inorganic optical fiber is an optical fiber in which light propagates substantially in inorganic substances, such as silica, silicates, fluoride glasses, and chalcogenide glasses.

The methods of the present invention are especially advantageous when used to form curved elements on the ends of small supporting members. For example, the end of the supporting member may have an area of less than about 5 mm$^2$, less than about 1 mm$^2$, less than about 0.5 mm$^2$, or even less than about 0.1 mm$^2$.

Figure 7:
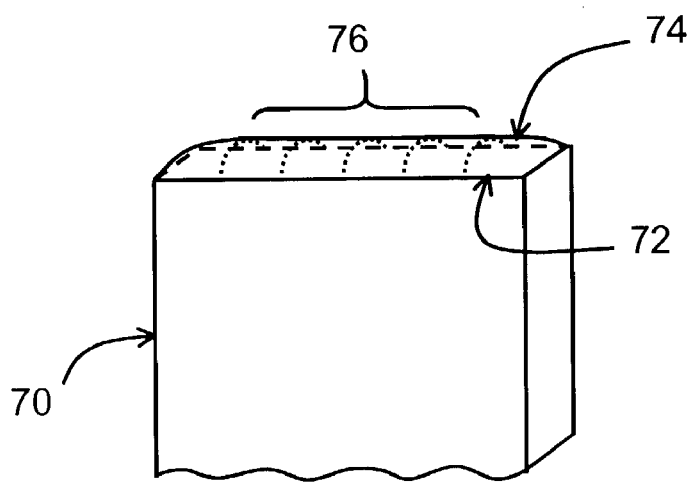
FIG. 7 is a perspective view of a droplet with a semi-cylindrical geometry in its central region.

In one embodiment of the present invention, the supporting member is an optical fiber having a radius of about 62.5 microns. Dipping the end of an optical fiber with a radius of 62.5 microns into a bulk sample of UV9300 (an epoxysilicone-based curable composition) will form a convex droplet with a radius of curvature of about 65 μm. As described above, the volume of this droplet can be reduced by evaporation or by transfer, resulting in a droplet with a radius of curvature greater than about 65 μm. Cylindrical supporting members with different radii will have droplets with different minimum radii of curvature. For example, a droplet of UV9300 formed by dipping on a cylindrical supporting member with a radius of about 25 μm will have a radius of curvature of about 27 μm. A droplet of UV9300 formed by dipping on a cylindrical supporting member with a radius of about 5 μm will have a radius of curvature of about 5 μm. Droplet sizes will vary with supporting member radius in a similar manner for other curable compositions. Supporting members with different shapes will have different droplet geometries. For example, a supporting member 70 having an end 72 with a rectangular shape will support a droplet 74 with a semi-cylindrical geometry in its central region 76, as shown in FIG. 7. A semi-cylindrical droplet need not be exactly cylindrical; it can be acylindrical toward its edges, and substantially cylindrical in its central region.

After the droplet of curable element composition is formed, it is cured by an appropriate source of energy, such as heat or actinic radiation, to form the curved element 40. The skilled artisan will recognize that room-temperature curable compositions may also be used in the methods of the present invention. Art-recognized curing techniques such as post-baking may be used in this process. The curved element will have approximately the same radius of curvature as the droplet of curable element composition. The radius of curvature of the curved element may be slightly larger than that of the droplet due to shrinkage during cure. If the supporting member is an optical element such as an optical fiber, the curved element may be used as a lens. The curved element may also be used as a mold in a subsequent molding process, as will be described below. As described above, on a fiber having a radius of about 62.5 μm, a convex droplet may have a radius of curvature of about 65 microns or greater. The convex element formed by curing such a droplet will likewise have a radius of curvature of about 65 μm or greater.

Another aspect of the present invention provides a method for forming a curved element having a curved free surface on the end of a supporting member. The method includes the steps of providing a mold element having a curved surface; forming a droplet of a curable element composition on the end of the supporting member; contacting the droplet of curable element composition with the curved surface of the mold element; curing the droplet of curable element composition to form the curved element on the end of the supporting member; and removing the curved element from the mold element. In this method, the curved surface of the droplet is defined by contact with the curved surface of the mold element. A single mold element may be reused to provide multiple curved element-terminated supporting members. In a preferred embodiment of the invention, the supporting member is an inorganic optical fiber.

Figure 8:
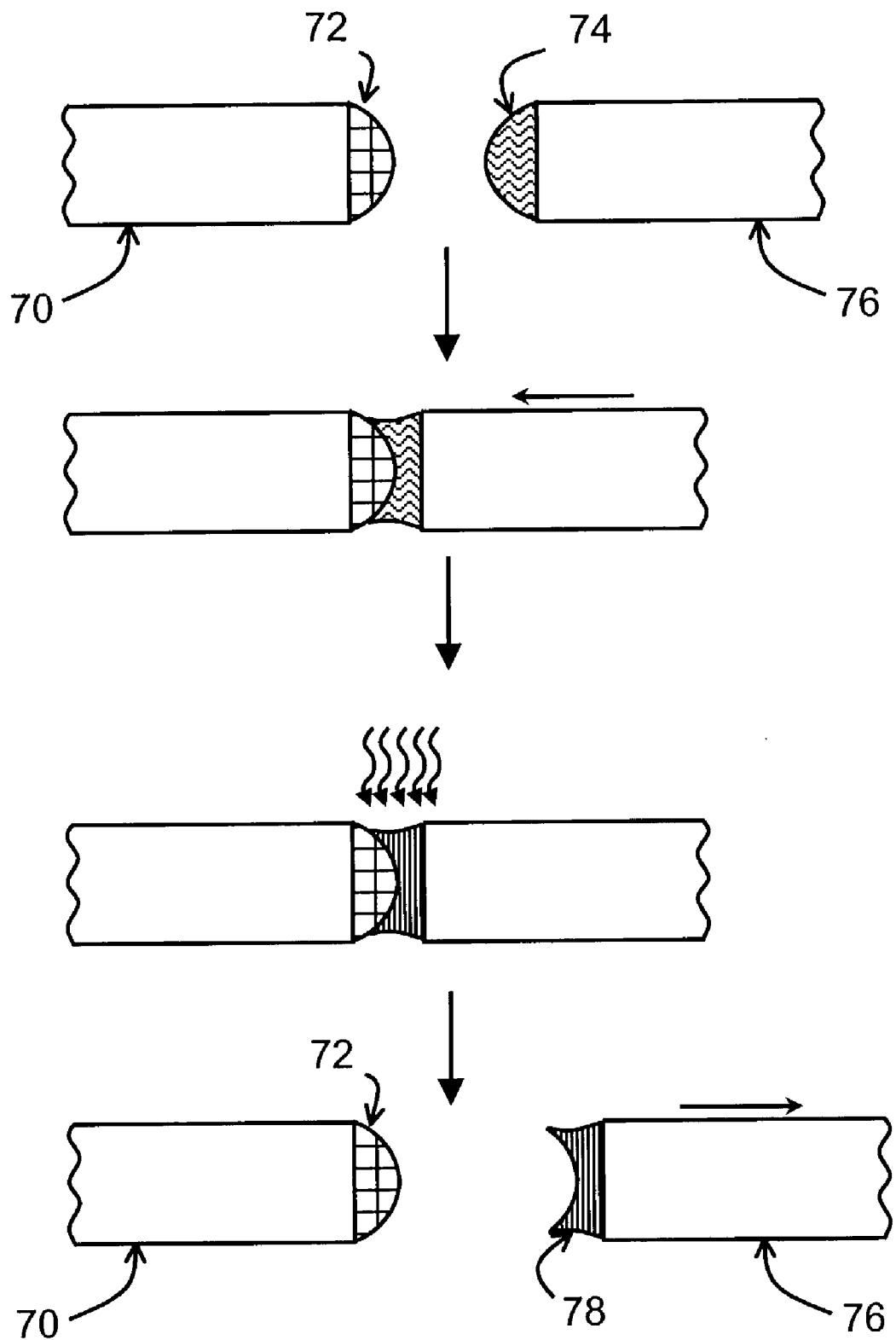
FIG. 8 illustrates a method of forming a concave element on the end of a supporting member.

In one embodiment of the present invention, shown in FIG. 8, a convex mold member is used to form a concave element on the end of a supporting member. A convex mold element 72 having a surface with a desired curvature is provided. The convex mold element 72 is formed on mold support member 70. The convex mold element 72 may be created as described above. The evaporation and transfer techniques described above may be used advantageously to control the curvature of the convex mold element. The convex mold element 72 on the end of the mold support member is preferably formed from a material with good release properties, such as a silicone material, an epoxysilicone material, or a fluoropolymer. Alternatively, the surface of the mold element may be treated with a release agent, using processes familiar to the skilled artisan.

Using the dipping or transfer methods described above, a droplet 74 of curable element composition is formed on the end of a supporting member 76. The identity of the curable element composition will depend upon the eventual application of the concave element. The curable element composition can be virtually any desired curable liquid composition. The cured material should release easily from the surface of the convex mold element. The droplet is brought into contact with the curved surface of the convex mold element 70, taking the shape of the mold. While in contact with the convex mold element, the droplet is cured, forming a concave element 78 on the end of the supporting member. The concave element 78 is removed from the convex mold element by pulling the supporting member away from the convex mold element. The concave element has a curvature that is essentially the inverse of the curvature of the convex mold element. For example, use of a semi-spherical convex mold element with a radius of curvature of about 65 μm will yield a concave member with a semi-spherical indentation having a radius of curvature of about 65 μm. Likewise, use of semi-spherical convex mold element with a radius of curvature of about 20 μm will yield a concave member with a radius of curvature of about 20 μm. Use of a semi-cylindrical convex mold element will provide a concave member with a semi-cylindrical indentation.

Depending on the application of the convex element-terminated supporting member, the alignment of the supporting member to the center of the concave element may be critical. Mechanical fixturing may be used to position the supporting member with respect to the mold element. If the convex mold element is formed on the end of an a mold support member using the methods described above, it will be centered on the mold support member. Alignment of the center of the supporting member with the center of the mold member will align the center of the convex mold element, and hence the formed concave element, with the center of the supporting member. Alternatively, a machine vision system can be used to align the supporting member to the mold member. For example, when the supporting member is an optical fiber, and the mold element is formed on the end of an optical fiber, an optical fiber fusion splicing system may be used to perform the visual alignment. Commercially available fusion splicing systems such as an Ericsson FSU 975 or an Ericsson 995 can be used to visually align the two optical fibers as well as to perform the contacting operations.

Figure 9:
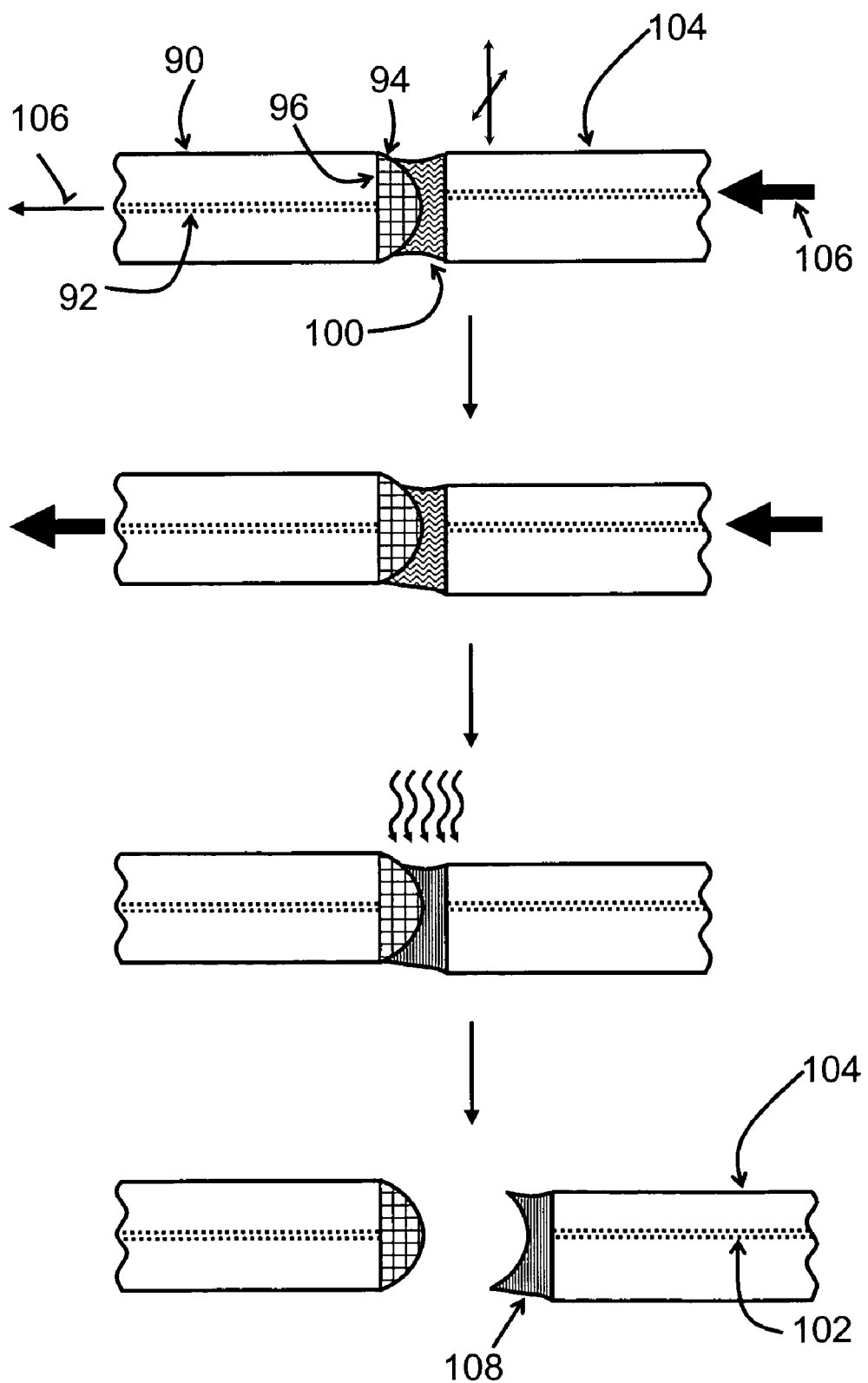
FIG. 9 illustrates a method of forming a concave element in alignment with the core of an optical fiber.

When precise optical alignment of the concave element to the core of the optical fiber is necessary, an active alignment process may be used. As shown in FIG. 9, if the supporting member 104 is an optical fiber, and the mold support member 90 is an optical fiber having a core 92 and a convex mold element 94 on its end 96, an alignment system of the type typically used for pigtailing, such as a Newport AUTOALIGN system may be used to perform the active alignment. Preferably, the apex of the mold element is well-aligned with the core 92. After the droplet 100 is brought into contact with the surface of the convex mold element, the relative positions of the supporting member 104 and the mold support member may be adjusted to optimize the throughput of an optical signal 106 coupled between the two, thereby optimizing the alignment of the core 92 of the mold support element and the core 102 of the supporting member 104. After alignment, the droplet may be cured to form the concave element, as described above.

Figure 10:
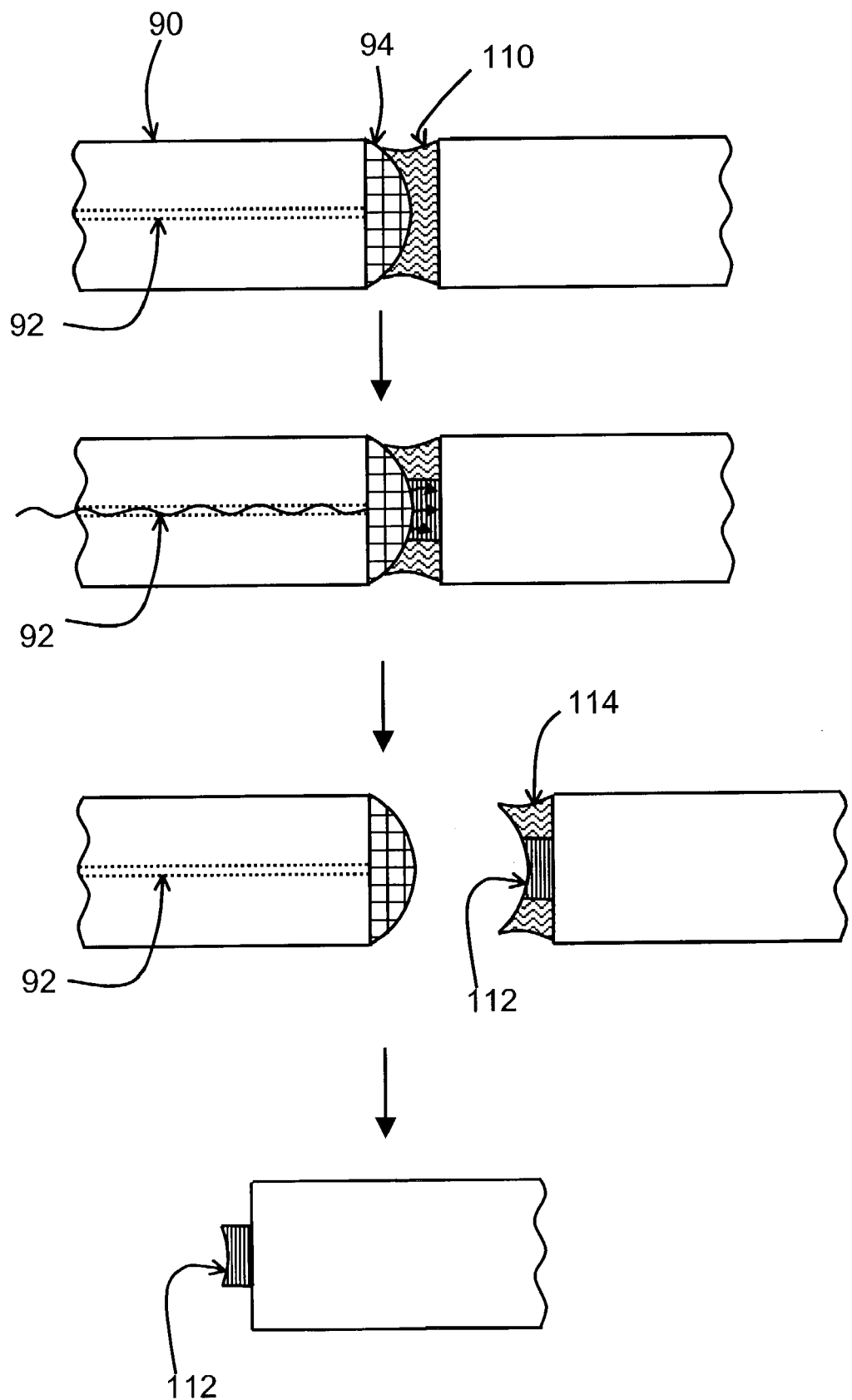
FIG. 10 illustrates a method of forming a concave element on the end of a supporting member.

For some applications, it may be desirable to provide a concave element that does not cover the entire end of the supporting member. In one embodiment of the invention, shown in FIG. 10, the mold support member 90 is an optical fiber. The droplet 110 is brought into contact with the convex mold element 94, then is cured by actinic radiation coupled from the mold support member, through the convex mold element, and into the droplet. Only a central portion of the droplet will be cured. The size of the cured region will depend on the mode field diameter of the mold support member fiber, the size of the convex optical element, and the duration, intensity and wavelength of the irradiation. The concave element 112 thus formed is removed from the mold member, and any uncured curable element composition (114) is washed away with an appropriate solvent.

Figure 11:
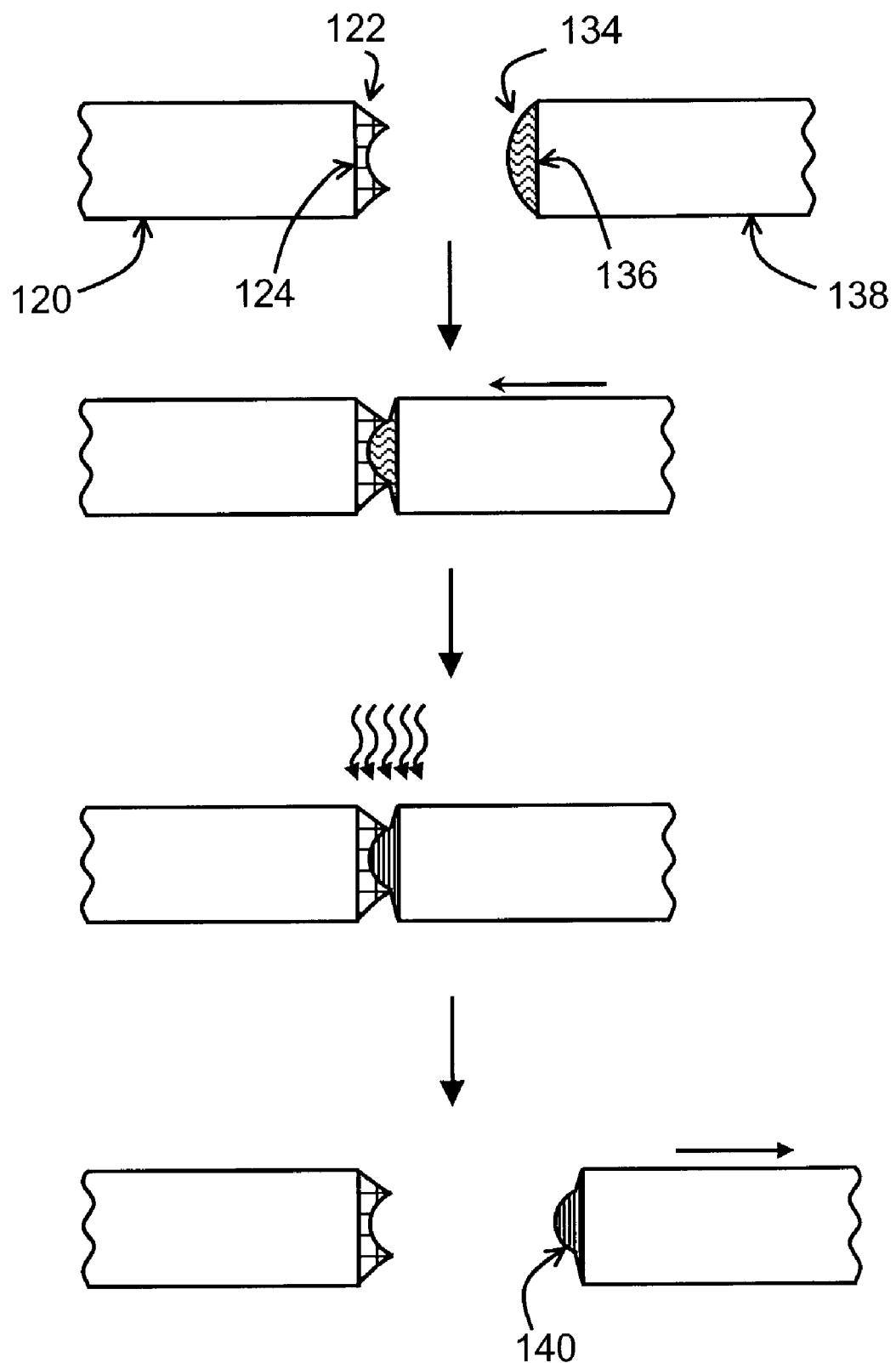
FIG. 11 illustrates a method of forming a convex element on the end of a supporting member.

In another embodiment of the invention, shown in FIG. 11, a concave mold element is used to form a convex element. A mold support member 120 having on its end 124 a concave mold element 122 having a surface with a desired curvature is provided. The concave mold element 122 at the end of the mold support member 120 may be formed using the techniques described herein, and is preferably formed from a material with good release properties, such as a silicone material, an epoxysilicone material, or a fluoropolymer. Alternatively, the surface of the mold element may be treated with a release agent, using processes familiar to the skilled artisan. Using the dipping or transfer methods described above, a droplet 134 of curable element composition is formed on the end 136 of an supporting member 138. As described above, the supporting member may be an optical fiber. The identity of the curable element composition will depend upon the eventual application of the convex element. The curable element composition can be virtually any desired curable liquid composition. The cured material should release easily from the concave mold element. The droplet 134 is brought into contact with the concave mold element 122, taking the shape of the curved surface. While in contact with the curved surface of the concave mold element, the droplet is cured, forming a convex element 140 on the end of the supporting member. The convex element 140 is removed from the concave mold element. The convex element has a curvature that is essentially the inverse of the curvature of the concave mold element. For example, use of a semi-spherical concave mold element with a semi-spherical indentation having a radius of curvature of about 65 µm will yield a convex element with a radius of curvature of about 65 µm. Likewise, use of a semi-spherical concave mold element with a radius of curvature of about 20 µm will yield a convex element with a radius of curvature of about 20 µm. Use of a semi-cylindrical concave mold member will provide a convex element with a semi-cylindrical indentation. The curvature of the convex element is determined by the curvature of the concave mold element, and not by the area of the end of the optical fiber. As such, the use of this molding process allows for the formation of more highly curved convex elements on the end of a supporting member than is possible using only a dipping technique.

The techniques described above may be used to form the concave mold element. For example, a droplet of a curable element composition may be formed on a first supporting element by dipping, and cured to yield a convex element. The curvature of this element is determined, in part, by the area of the end of the first supporting element. The evaporation and transfer techniques described above may be advantageously to control the curvature of the convex element. Next, a droplet of a curable mold composition may be formed on a mold member, brought into contact with the convex element, and cured to form concave mold element. The shape of the concave mold element will be essentially the inverse of the convex element. For example, a first supporting element of a small radius can be used to form a highly curved convex element, which may be used to form a highly curved concave mold element on the end of a relatively large mold support member. The visual and active alignment techniques described above may be used to ensure alignment of the concave mold element on the mold support member.

Another aspect of the present invention provides a method for forming an element on the end of an supporting member. The method includes the steps of providing a mold element having a curved surface; forming a droplet of a curable element composition on the curved surface of the mold element; contacting the droplet of curable element composition with the end of the supporting member; curing the droplet of curable element composition to form the element on the end of the supporting member; and removing the element from the mold element. The supporting member may be an optical fiber, as described above. The curved surface of the mold element may be convex or concave, and may be fabricated using the methods described above. As the skilled artisan will appreciate, the visual and active alignment techniques described above may be used to ensure alignment of the end of the supporting member with the mold element.

Figure 12:
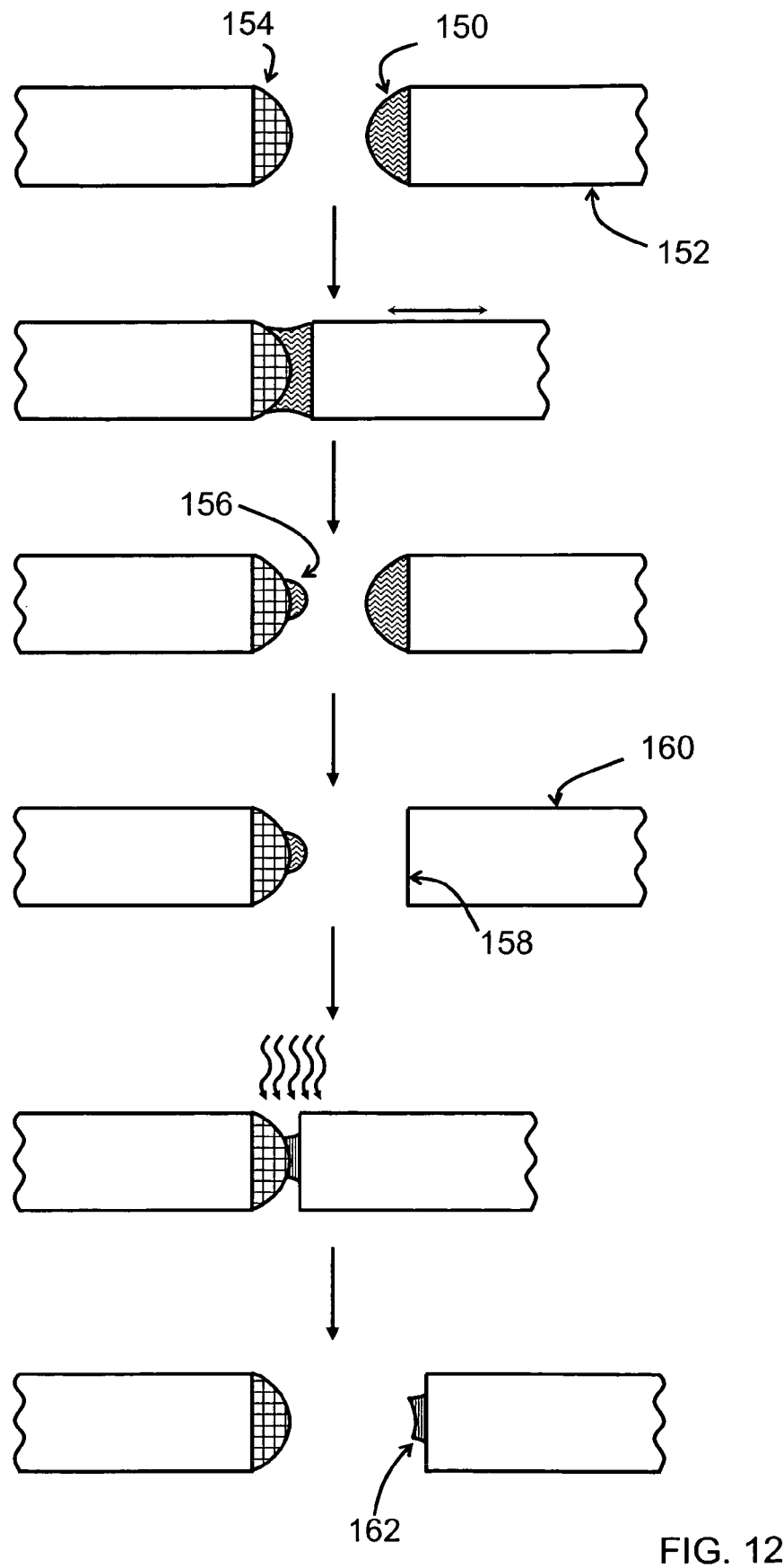
FIG. 12 illustrates a method of forming an element on the end of an supporting member.

The droplet may be formed on the curved surface of the mold element by transfer from a drop on the end of a reservoir member, as shown in FIG. 12. A drop 150 of curable element composition is formed on the end of a reservoir member 152, and is brought into and out of contact with the curved surface of a mold element 154, thereby forming a droplet 156 of the curable element composition on the curved surface of the mold element. The volume of the droplet will depend upon the wettability of the surface of the mold element as well as on the volume of the drop and the area of the end of the reservoir member. An end 158 of a supporting member 160 is then brought into contact with the droplet 156, and the droplet is cured to yield the curved element 162. Use of this technique is advantageous in that it provides a relatively small droplet volume, and therefore a relatively small curved element on the end of the supporting member.

As the skilled artisan will appreciate, it is difficult to predict the exact curvatures that will be obtained using different materials and supporting, transfer, and reservoir members in the methods of the present invention. The skilled artisan will, however, be able to achieve elements with a desired curvature using the teachings of this disclosure in conjunction with minimal experimentation. Once parameters are determined for a particular combination of materials and supporting, transfer and reservoir members, the processes described herein gives substantially reproducible results.

Another aspect of the present invention is an optical structure including an optical fiber having an end; and a concave element on the end of the optical fiber, wherein the optical fiber is an inorganic optical fiber, and the concave element is made from a cured polymeric material. The molding methods described above may be used to make the concave element.

Another aspect of the present invention is an optical structure including an optical fiber having an end; and a curved element on the end of the optical fiber, wherein the optical fiber is an inorganic optical fiber, and the curved element is made from a cured polymeric material, and has a radius of curvature of greater than about 50 µm. The methods described above may be used to make the curved element.

Figure 13:
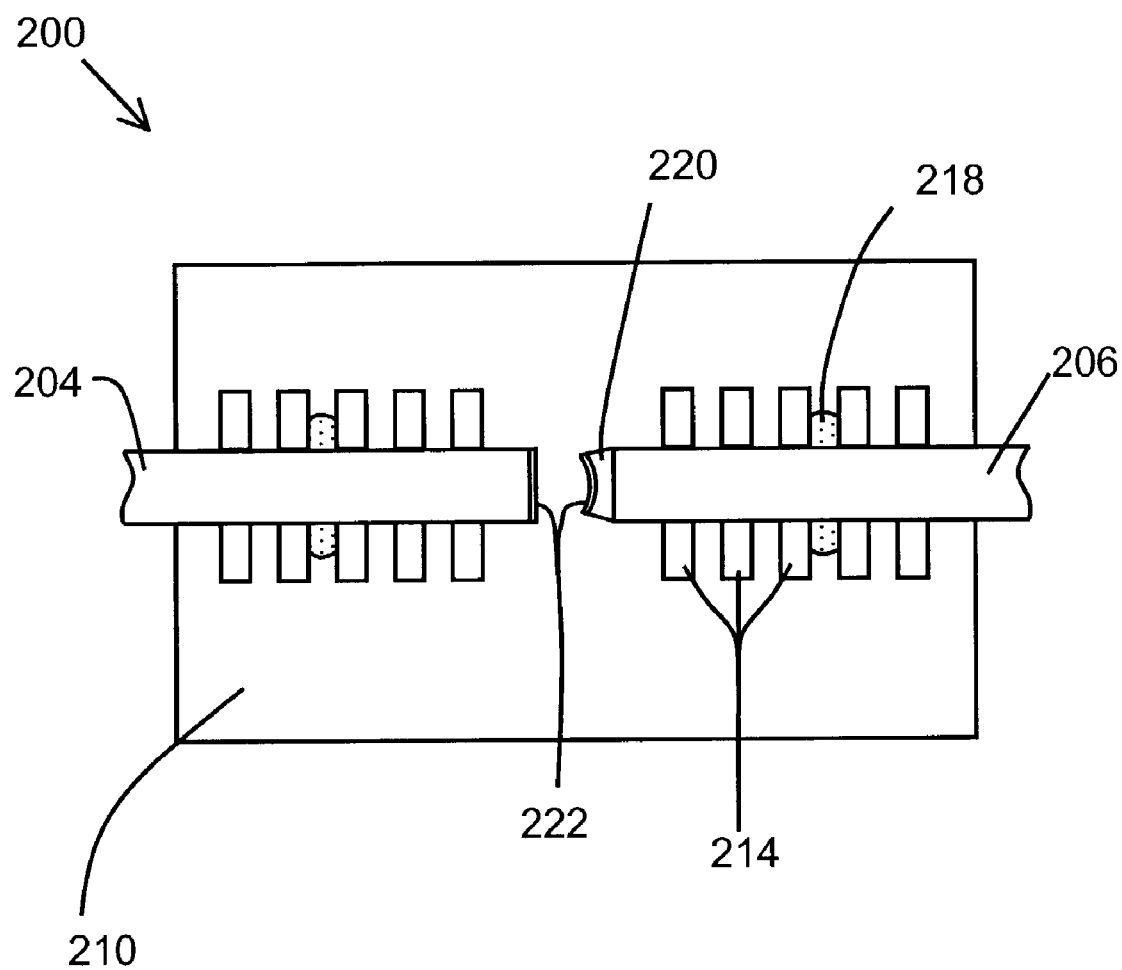
FIG. 13 is a top view of a fiber-based Fabry-Perot filter using a concave element made using the methods of the present invention.

The curved elements provided by the present invention have many potential uses. For example, as described herein, they may be used as mold elements in molding processes. Semi-spherical and semi-cylindrical convex optical elements on the ends of optical fibers may be used as lenses for focusing or collimating. A semi-spherical concave optical element on the end of a fiber may be coated with a partially reflective coating and used in the construction of a fiber-based Fabry-Perot resonator, shown in FIG. 13 and described in U.S. patent application Ser. No. 09/676,413. In the resonator device 200, optical fibers 204 and 206 are held onto a piezoelectric substrate 210 by polymer grippers 214. Polymer grippers are described in U.S. Pat. No. 6,266,472. Spots of adhesive 218 hold the fibers in place relative to a selected pair of grippers. One of the fibers has a concave element 220 on its end. The surface of the concave element as well as the end of the other fiber are coated with partially transmissive (95–99.9% reflective) mirrors 222. Piezoelectrically controlling the length of the substrate will change the distance between the ends of the fibers, and therefore tune the center wavelength of the filter. The skilled artisan will envision other uses for the convex and concave elements provided by the present invention.

The following non-limiting examples serve to further describe the invention.

EXAMPLE 1

A solution of 2.63 g UV9300, an epoxy-functional poly (dimethylsiloxane) prepolymer available from General Electric, Inc. of Schenectady, N.Y.; 0.04 g UV9380c, a iodonium salt-based photoinitiator package available from General Electric; and 4.00 g dry cyclohexanone was prepared in an opaque container. An optical fiber having a diameter of 125 µm was stripped and cleaved using conventional methods. The fiber was mounted onto a stage controlled by a stepper motor, and an end of the fiber was lowered into the silicone solution to a depth of about 0.5 mm. The fiber was slowly extracted from the solution at a rate of about 2 µm/s, forming a droplet of the silicone solution on the end of the fiber. The fiber was allowed to stand in air for 10 minutes to allow the cyclohexanone solvent to evaporate. The droplet was cured with a dosage of 5.2 J/cm$^2$ in a Fusion Systems UV belt system, yielding a semi-spherical convex element with a radius of curvature of 120 µm.

EXAMPLE 2

An optical fiber having a diameter of 125 µm was stripped and cleaved using conventional methods. The fiber was mounted onto a stage controlled by a stepper motor, and an end of the fiber was lowered to a depth of about 0.5 mm into a sample of NORLAND 83H, a mercaptoester-based UV curable composition available from Norland Products, Inc. of Cranberry, N.J. The fiber was withdrawn from the curable composition at a rate of about 2 µm/s, forming a droplet on the end of the fiber. The end of the fiber was placed in one side of an Ericsson 995 fusion splicer. A convex element-terminated fiber prepared by the method of Example 1 was placed in the other side of the fusion splicer for use as a mold. The fusion splicer was used solely as a visual alignment tool, and was programmed not to pre-clean the fibers nor to undergo the actual fusion process. The fusion splicer was used to visually align the fibers, and the aligned ends were pushed together until the droplet was in contact with the mold and the end of the fiber was about 10 µm from the apex of the mold. The droplet was cured using a GREENSPOT UV source for 60 seconds, yielding a semi-spherical concave element with a radius of curvature of 120 µm.

EXAMPLE 3

A solution of UV 9300 and UV 9380 (100:1 v/v) was prepared in an opaque container. Three optical fibers having a diameter of 125 µm were stripped and cleaved using conventional methods. One fiber was mounted onto a stage controlled by a stepper motor, and an end of the fiber was lowered to a depth of about 0.5 mm into the silicone solution. The fiber was slowly extracted from the solution at a speed of about 2 µm/s, forming a droplet on the end of the fiber. The droplet-terminated fiber was placed in one side of an Ericsson 995 fusion splicer. A second fiber was placed in the other side of the fusion splicer, and the ends of the fibers were aligned. The fibers were pushed together until the droplet was in contact with the ends of both fibers. The fibers were separated, leaving droplets having about half the volume of the original droplet on the end of each fiber. One of these fibers was removed from the fusion splicer and replaced by a third fiber. The two fibers were aligned, brought into contact and separated as above, leaving droplets having about a quarter of the volume of the original droplet on the end of each fiber. The fibers were removed from the fusion splicer, and the droplets were cured with a dosage of 5.2 J/cm$^2$ in a Fusion Systems UV belt system, yielding two fibers terminated with semi-spherical convex elements having a radius of curvature of 200 μm.

EXAMPLE 4

An optical fiber is stripped and cleaved using conventional methods. The glass surface of the stripped fiber is cleaned with UV-generated ozone by exposing the fiber to high intensity UV radiation in air for 1 hour, rotating the fiber halfway through the exposure. The cleaned fiber is held for two hours in the headspace of a sealed chamber having a small amount of liquid heptadecafluorodecyl-1H,1H,2H, 2H-trichlorosilane. The fiber allowed to cure overnight in air, and rinsed with alcohol and water. The glass surfaces of the fiber are thereby rendered dewetting. The end of the treated fiber is cleaved and polished, thereby forming a fiber with dewetting sidewalls and a wetting end. The end of the fiber is dipped into a sample of NORLAND 83H, forming a droplet on the end of the fiber. The droplet is cured, yielding a convex element having a radius of curvature of about 67 μm.

It will be apparent to those skilled in the art that various modifications and variations can be made to the present invention without departing from the scope of the invention. Thus, it is intended that the present invention cover the modifications and variations of this invention provided they come within the scope of the appended claims.

Any discussion of the background to the invention herein is included to explain the context of the invention. Where any document or information is referred to as "known", it is admitted only that it was known to at least one member of the public somewhere prior to the date of this application. Unless the content of the reference otherwise clearly indicates, no admission is made that such knowledge was available to the public or to experts in the art to which the invention relates in any particular country (whether a member-state of the PCT or not), nor that it was known or disclosed before the invention was made or prior to any claimed date. Further, no admission is made that any document or information forms part of the common general knowledge of the art either on a world-wide basis or in any country and it is not believed that any of it does so.

The invention claimed is:

1. A method for forming an element having a free curved surface on an end of a supporting member, the method comprising the steps of:
   (a) forming a droplet of a curable element composition on the end of the supporting member, the droplet having a curved surface remote from the supporting member;
   (b) bringing the droplet into and out of contact with an end of a transfer member, thereby transferring a portion of the droplet of curable element composition to the end of the transfer member and decreasing the volume of the droplet of curable element composition on the supporting member; and
   (c) curing the droplet of the liquid composition, thereby solidifying it to form the element,
   wherein the volume of the droplet of curable element composition on the supporting member is adjusted by multiple transfers.

2. A method for forming an element having a free curved surface on an end of a supporting member, the method comprising the steps of:
   forming a droplet of a curable element composition on the end of the supporting member, the droplet having a curved surface remote from the supporting member;
   providing a mold element having a curved surface;
   bringing the droplet into contact with the surface of the mold;
   curing the droplet of the liquid composition, thereby solidifying it to form the element,
   wherein the supporting member comprises a first optical fiber; and
   wherein the mold element is formed on the end of a mold support member, the mold support member including a second optical fiber, and wherein the alignment of the optical fiber to the mold element is performed by optimizing the throughput of an optical signal between the first optical fiber and the second optical fiber.

3. The method of claim 2 wherein the mold element is formed on the end of a mold support member, the mold support member including an optical fiber, and wherein the curing step is performed by coupling actinic radiation from the mold support member into a central volume of the curable element composition, whereby the central volume of the curable element composition is cured, and further comprising, after curing, the step of
   rinsing away any uncured curable element composition with a suitable solvent.

4. The method of claim 2 wherein the mold element is convex, and so the element is concave.

5. The method of claim 2 wherein the mold element has a free curved surface on an end of a mold supporting member, and is fabricated by the method comprising the steps of:
   (a) forming a droplet of a liquid composition on the end of the mold supporting member, the droplet having a curved surface remote from the mold supporting member;
   (b) causing the droplet of the liquid composition to solidify by curing it to form the mold element.

* * * * *